United States Patent
Chang et al.

(10) Patent No.: US 6,728,349 B2
(45) Date of Patent: Apr. 27, 2004

(54) METHOD FOR NOTIFYING AND REMINDING PHONE USERS OF MISSED CALLS

(75) Inventors: Jen-Chun Chang, Taipei (TW); Huang-Fu Teng, Shinjuang (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/410,763

(22) Filed: Apr. 10, 2003

(65) Prior Publication Data

US 2003/0198324 A1 Oct. 23, 2003

(30) Foreign Application Priority Data

Apr. 23, 2002 (TW) ........................... 91108350 A

(51) Int. Cl.[7] ............................................. H04M 11/00
(52) U.S. Cl. ............................. 379/93.23; 379/142.01; 455/567
(58) Field of Search ................... 379/93.23, 90.01, 379/110.01, 142.01; 455/412, 556, 566, 567

(56) References Cited

U.S. PATENT DOCUMENTS

2001/0029194 A1 * 10/2001 Ketola et al. ................ 455/567
2002/0127998 A1 * 9/2002 Katayanagi .................. 455/412

FOREIGN PATENT DOCUMENTS

JP          58036065 A  *  3/1983  ............ H04M/3/42
JP       2001274879 A  * 10/2001  ............ H04M/1/00

* cited by examiner

Primary Examiner—Wing Fu Chan
(74) Attorney, Agent, or Firm—Ladas & Parry

(57) ABSTRACT

A method for notifying and reminding phone users of missed calls. The method is characterized in that when an incoming call is unanswered, the telephone notifies and subsequently reminds the user of the incoming call at a time period interval in a predetermined manner.

15 Claims, 2 Drawing Sheets

METHOD FOR NOTIFYING AND REMINDING PHONE USERS OF MISSED CALLS

BACKGROUND OF THE INVENTION

1. Field of the Invention

The present invention relates in general to a method for notifying and reminding phone users of missed calls. In particular, the present invention relates to a method for notifying and reminding phone users of missed calls in a manner predetermined by the users.

2. Description of the Related Art

Currently, when a phone or standard phone receives an incoming call unanswered by the user, information for the incoming call is often displayed in a liquid crystal display. FIG. 1 shows display of an incoming call on a mobile phone. As shown in FIG. 1, when a mobile phone 10 receives an incoming call, information for the incoming call is displayed on a liquid crystal display 12. When the user of the mobile phone 10 does not respond, the telephone number is displayed on the liquid crystal display 12. The user of the mobile phone 10 may not to notice the display on the LCD 12 for some time, causing inconvenience.

SUMMARY OF THE INVENTION

An object of the present invention is to provide a method for notifying and reminding the user of a telephone about a missed call in a manner predetermined by the user to provide increased convenience for the user.

The method for notifying and reminding phone users of missed calls of the invention is characterized in that when a telephone receives a call that remains unanswered by the user, the telephone periodically notifies and subsequently reminds the user in a time period interval, in a manner specified by the user.

Furthermore, the invention also provides another method for notifying and reminding phone users of missed calls. When call is not answered, the inventive procedure begins and is repeated within a maximum time period until the user registers the information, by means of the telephone vibrating or ringing. The duration of the time period and the maximum time are predetermined. The procedure is terminated at the end of the maximum time when the missed call is not registered by the user.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The invention provides a method for notifying and reminding the user of a telephone about a missed call in a manner predetermined by the user. In the following description, a mobile phone is used as an example and, together with the accompanying drawings, the embodiment of the present invention can be understood.

Figure 1:
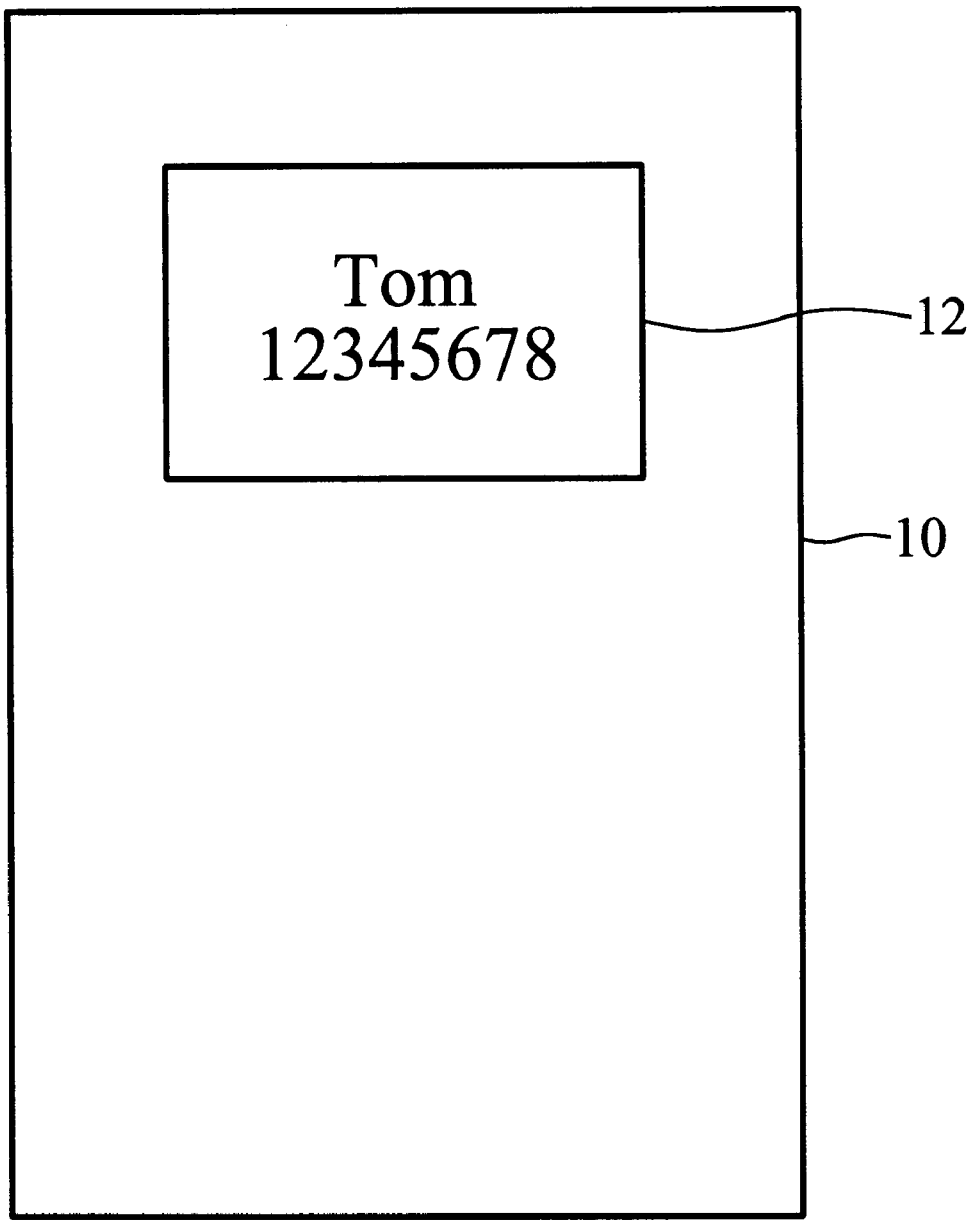
FIG. 1 shows display of an incoming call on a mobile phone in the prior art.
Figure 2:
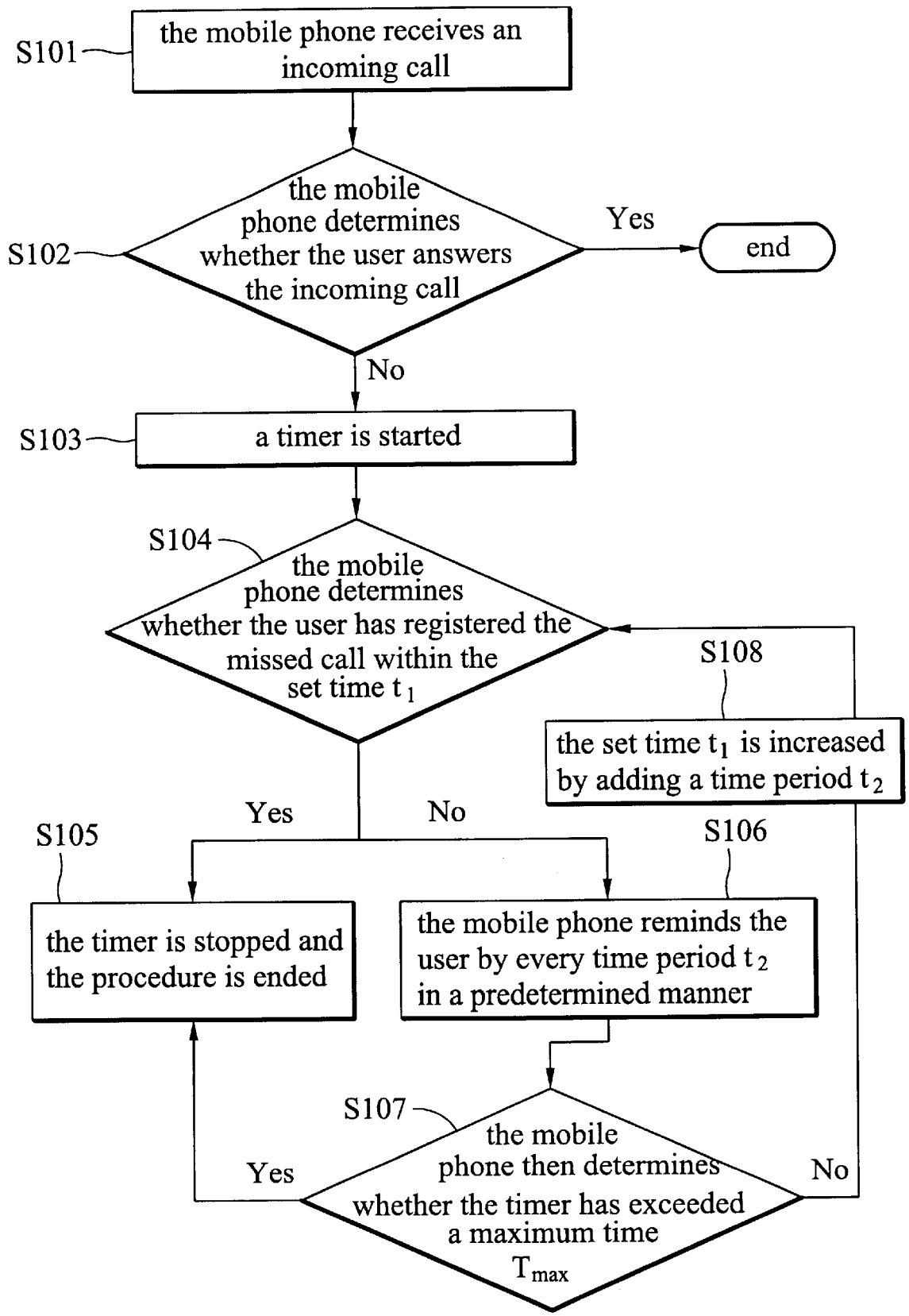
FIG. 2 is a flowchart illustrating the method for notifying and reminding phone users of missed calls according to the invention.

FIG. 2 is a flowchart illustrating the method for notifying and reminding phone users of missed calls according to the embodiment of the invention. As shown in FIG. 2, first, the mobile phone receives an incoming call (s101). Then, the mobile phone determines whether the user answers the incoming call (s102). If the user answers the incoming call, the procedure is ended. If the user does not answer the incoming call, a timer is started (s103). The mobile phone displays information for the missed call on the liquid crystal display. The mobile phone thus determines whether the user has registered the missed call within the set time $t_1$ (s104). If the user registers the missed call during the set time $t_1$, the timer is stopped and the procedure is ended (s105). If the user does not register the missed call during the set time $t_1$, the mobile phone reminds the user in a predetermined manner (s106), such as playing a special sound effect, predetermined music, or vibration. The mobile phone then determines whether the timer has exceeded a maximum time $T_{max}$ (s107). If not, the set time $t_1$ is increased by adding a time period $t_2$ (s108) and, step s104 is repeated. Thus, if the user keeps ignoring the unanswered call, the mobile phone will remind the user by every time period $t_2$ in a predetermined manner (s106), such as playing a special sound effect, predetermined music, or vibration. Besides, to achieve the powering saving purpose, when the timer exceeds the maximum time $T_{max}$, the procedure is ended (s105), the mobile phone automatically stops the procedure.

The maximum time $T_{max}$, the set time t1 and the time period t2 are predetermined by the user of the mobile phone.

Besides, the time period t2 is also settable to be a variable to the timer. For example, the longer the times goes, the shorter the time period t2. Thus makes an aggressive alert on the reminding to the users of the mobile phone. As well as a mobile phone, the notification and reminding method of the invention also applies to a standard telephone.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Thus, the scope of the appended claims should be accorded the broadest interpretation so as to encompass all such modifications and similar arrangements.

What is claimed is:

1. A method for notifying and reminding phone users of missed calls of a phone, characterized in that when a call is unanswered, the phone notifies and subsequently reminds users of the phone at a time period interval in a predetermined manner, wherein a timer is activated if the phone is not answered, and the time period interval changed by the timer increases if the call is not registered and, after a predetermined maximum time is elapsed the phone stops issuing reminders.

2. The notification and reminding method as claimed in claim 1, wherein the predetermined manner is vibration of the phone.

3. The notification and reminding method as claimed in claim 1, wherein the predetermined manner is ringing of the phone.

4. The notification and reminding method as claimed in claim 3, wherein the phone plays a predetermined sound effect.

5. The notification and reminding method as claimed in claim 3, wherein the phone plays predetermined music.

6. The notification and reminding method as claimed in claim 1, wherein the phone is a mobile phone.

7. The notification and reminding method as claimed in claim 6, wherein the phone is a standard telephone.

8. The notification and reminding method as claimed in claim 1, wherein the phone is a standard telephone.

9. A method for notifying and reminding phone users of missed calls, comprising steps as follows:

starting, upon receipt of a missed call, a reminding procedure to notify users of the phone at a time period interval in a predetermined manner, wherein the time period interval is changed by a timer;

decreasing the time period interval if the timer is less than a maximum time; and repeating the reminding procedure until the user registers the information.

10. The notification and reminding method as claimed in claim 9, wherein the phone plays a predetermined sound effect.

11. The notification and reminding method as claimed in claim 9, wherein the phone plays predetermined music.

12. The notification and reminding method as claimed in claim 9, wherein the maximum time is predetermined.

13. The notification and reminding method as claimed in claim 9 further comprising a step of:

stopping the reminding procedure automatically when the duration of the reminding procedure exceeds the maximum time.

14. The notification and reminding method as claimed in claim 9, wherein the predetermined manner is vibration.

15. The notification and reminding method as claimed in claim 9, wherein the predetermined manner is ringing of the phone.

* * * * *